(12) United States Patent
Izumi et al.

(10) Patent No.: US 12,322,987 B2
(45) Date of Patent: *Jun. 3, 2025

(54) BATTERY MANAGEMENT SYSTEM AND BATTERY MANAGEMENT METHOD

(71) Applicant: TOYOTA JIDOSHA KABUSHIKI KAISHA, Toyota (JP)

(72) Inventors: Junta Izumi, Nagoya (JP); Kenji Kimura, Nagoya (JP); Masakazu Habu, Toyota (JP); Masanosuke Sufu, Toyota (JP); Makito Muramatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 538 days.

This patent is subject to a terminal disclaimer.

(21) Appl. No.: 17/681,172

(22) Filed: Feb. 25, 2022

(65) Prior Publication Data

US 2022/0311248 A1 Sep. 29, 2022

(30) Foreign Application Priority Data

Mar. 23, 2021 (JP) ................................ 2021-048294

(51) Int. Cl.
*H02J 7/00* (2006.01)

(52) U.S. Cl.
CPC ........ *H02J 7/0013* (2013.01); *H02J 7/00034* (2020.01); *H02J 7/0048* (2020.01); *H02J 7/005* (2020.01)

(58) Field of Classification Search
CPC .... H02J 7/0013; H02J 7/00034; H02J 7/0048; H02J 7/005
See application file for complete search history.

(56) References Cited

U.S. PATENT DOCUMENTS

| 10,044,069 B2 | 8/2018 | Despesse |
| 2011/0140648 A1* | 6/2011 | Lee ........................ H02J 7/34 307/66 |

(Continued)

FOREIGN PATENT DOCUMENTS

| EP | 3817184 A1 | 5/2021 |
| JP | 2010-066229 A | 3/2010 |

(Continued)

OTHER PUBLICATIONS

Dec. 3, 2024 Office Action issued in U.S. Appl. No. 17/695,897.
Dec. 6, 2024 Office Action issued in U.S. Appl. No. 17/699,640.

*Primary Examiner* — Zixuan Zhou
(74) *Attorney, Agent, or Firm* — Oliff PLC

(57) ABSTRACT

A battery cellar includes: battery groups each including a plurality of batteries; a power converter (AC/DC converter and DC/DC converter) electrically connected between the plurality of batteries and an electric power system; and a server that controls operation of the power converter in accordance with a DR request from the electric power system, to cause charging and discharging of the plurality of batteries. The battery groups include a low operating group and a high operating group that is less than or equal to the low operating group in terms of the number of types of ranks of batteries included in each battery group, where the ranks each represent a degree of battery degradation. The server suppresses charging and discharging of the plurality of batteries included in the low operating group, relative to charging and discharging of the plurality of batteries included in the high operating group.

6 Claims, 10 Drawing Sheets

(56) References Cited

U.S. PATENT DOCUMENTS

| | | | |
|---|---|---|---|
| 2012/0249057 A1* | 10/2012 | Abe | H02J 7/04 320/137 |
| 2013/0285612 A1 | 10/2013 | Okuda | |
| 2015/0171641 A1 | 6/2015 | Sato | |
| 2015/0349387 A1 | 12/2015 | Inaba et al. | |
| 2017/0205861 A1 | 7/2017 | Matsuda | |
| 2017/0366023 A1 | 12/2017 | Tanaka et al. | |
| 2019/0305386 A1 | 10/2019 | Lee et al. | |
| 2021/0021134 A1* | 1/2021 | Alipoor | H02J 7/0013 |
| 2021/0168964 A1 | 6/2021 | Nakaya | |
| 2021/0249701 A1 | 8/2021 | Shine et al. | |
| 2021/0265850 A1 | 8/2021 | Okino | |
| 2022/0196753 A1 | 6/2022 | Tong | |
| 2022/0305925 A1 | 9/2022 | Izumi et al. | |
| 2022/0308120 A1 | 9/2022 | Izumi et al. | |
| 2022/0311063 A1 | 9/2022 | Izumi et al. | |
| 2022/0311248 A1 | 9/2022 | Izumi et al. | |

FOREIGN PATENT DOCUMENTS

| | | | |
|---|---|---|---|
| JP | 2016-117354 A | 6/2016 | |
| JP | 2017-229137 A | 12/2017 | |
| JP | 2018-205873 A | 12/2018 | |
| WO | 2013/129499 A1 | 9/2013 | |
| WO | 2016/051701 A1 | 4/2016 | |
| WO | 2019/181659 A1 | 9/2019 | |
| WO | 2020/004053 A1 | 1/2020 | |

* cited by examiner

| BATTERY ID | MODEL NUMBER | MANUFACTURING DATE | SOC | FULL CHARGE CAPACITY | RANK | DEGRADATION EVALUATION DATE | STORAGE POSITION |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |
| ⋮ |  |  |  |  |  |  |  |

BATTERY MANAGEMENT SYSTEM AND BATTERY MANAGEMENT METHOD

This nonprovisional application is based on Japanese Patent Application No. 2021-048294 filed on Mar. 23, 2021 with the Japan Patent Office, the entire contents of which are hereby incorporated by reference.

BACKGROUND

Field

The present disclosure relates to a battery management system and a battery management method.

Description of the Background Art

Japanese Patent Laying-Open No. 2018-205873 describes prompting a user of an electric vehicle having a storage battery suitable for an electric power storage system to replace the storage battery.

SUMMARY

In recent years, vehicles equipped with battery packs for driving have been spread rapidly. Therefore, the number of used batteries collected along with the buying and disassembling of these vehicles is increasing. From the viewpoint of promoting the sustainable development goal (SDGs: Sustainable Development Goals), it is desired to manufacture a new assembled battery using the recovered used battery and reuse the used battery. The present inventors have focused on the following problems when reusing used batteries.

The batteries are stored in a logistics base or the like while waiting for use. Proper storage of batteries is costly. In addition, a certain amount of time (storage period) may be required from the input of the collected battery to the output for use. Therefore, it is desirable to effectively utilize the storage period of the battery.

It is conceivable to rank batteries according to their degree of degradation. The required rank varies depending on the usage or the like. Therefore, there is a possibility that a rank having a relatively high demand exists while a rank having a relatively low demand exists. In the battery management system, it is desirable to reserve a number of batteries as stocks for each rank in accordance with demand for use. On the other hand, the battery management system cannot adjust the rank of batteries to be recovered from the market. In addition, degradation of the battery progresses even during a storage period in the battery management system, which may result in a reduction in rank. This can cause a bias in the rank of inventory batteries.

The present disclosure has been made to solve the above-described problems, and an object of the present disclosure is to ensure inventory of batteries in each rank.

(1) A battery management system according to an aspect of the present disclosure includes: battery groups each including a plurality of batteries; a power converter electrically connected between the plurality of batteries and an electric power system; and a control device that controls operation of the power converter in accordance with a demand response request from the electric power system, to cause charging and discharging of the plurality of batteries included in the battery groups. The battery groups include a first battery group and a second battery group that is less than or equal to the first battery group in terms of the number of types of ranks of batteries included in each battery group, where the ranks each represent a degree of battery degradation. The control device suppresses charging and discharging of the plurality of batteries included in the first battery group, relative to charging and discharging of the plurality of batteries included in the second battery group.

With the above configuration (1), charging and discharging of a plurality of batteries included in the first battery group are suppressed, relative to charging and discharging of a plurality of batteries included in the second battery group which is less than or equal to the first battery group in terms of the number of types of ranks of batteries included in each battery group, where ranks each represent a degree of battery degradation. Thus, respective ranks of batteries included in the first battery group are maintained, relative to respective ranks of batteries included in the second battery group. As a result, a proper inventory of batteries of each rank can be ensured.

(2) The battery management system further includes a switching device capable of switching between electrical connection and electrical disconnection between the plurality of batteries and the electric power system. The control device controls the switching device to cause batteries included in the first battery group to be electrically disconnected from the electric power system.

With the above configuration (2), batteries included in the first battery group are electrically disconnected from the electric power system. Thus, respective ranks of batteries included in the first battery group can more reliably be maintained.

(3) The control device suppresses charging and discharging of batteries included in the first battery group, relative to charging and discharging of batteries included in the second battery group, when the batteries included in the first battery group have an SOC within a predetermined SOC range that enables progress of battery degradation to be suppressed.

With the above configuration (3), when the SOC of batteries included in the first battery group falls in a range that enables progress of battery degradation to be suppressed, charging and discharging of batteries included in the first battery group are suppressed. As a result, respective ranks of batteries included in the first battery group can be maintained.

(4) The control device causes an amount of charging and discharging power of batteries included in the first battery group in a predetermined period to be smaller than an amount of charging and discharging power of batteries included in the second battery group in the predetermined period.

(5) The control device causes a frequency of charging and discharging of batteries included in the first battery group to be lower than a frequency of charging and discharging of batteries included in the second battery group.

(6) The first battery group includes batteries of all ranks. Thus, all ranks of batteries included in the first battery group are maintained, relative to respective ranks of batteries included in the second battery group. As a result, a proper inventory of batteries of all ranks can be ensured.

(7) A battery management method according to another aspect of the present disclosure is a battery management method using a server. The method includes causing, by the server, charging and discharging of a plurality of batteries included in each of battery groups, in accordance with a demand response request from an electric power system. The battery groups include a first battery group and a second battery group that is less than or equal to the first battery group in terms of the number of types of ranks of batteries included in each battery group, where the ranks each represent a degree of battery degradation. Causing charging and discharging includes suppressing charging and discharging of the plurality of batteries included in the first battery group, relative to charging and discharging of the plurality of batteries included in the second battery group.

With the above method (6), a proper inventory of batteries of all ranks can be ensured, similarly to the above configuration (1).

DESCRIPTION OF THE PREFERRED EMBODIMENTS

Figure 1:
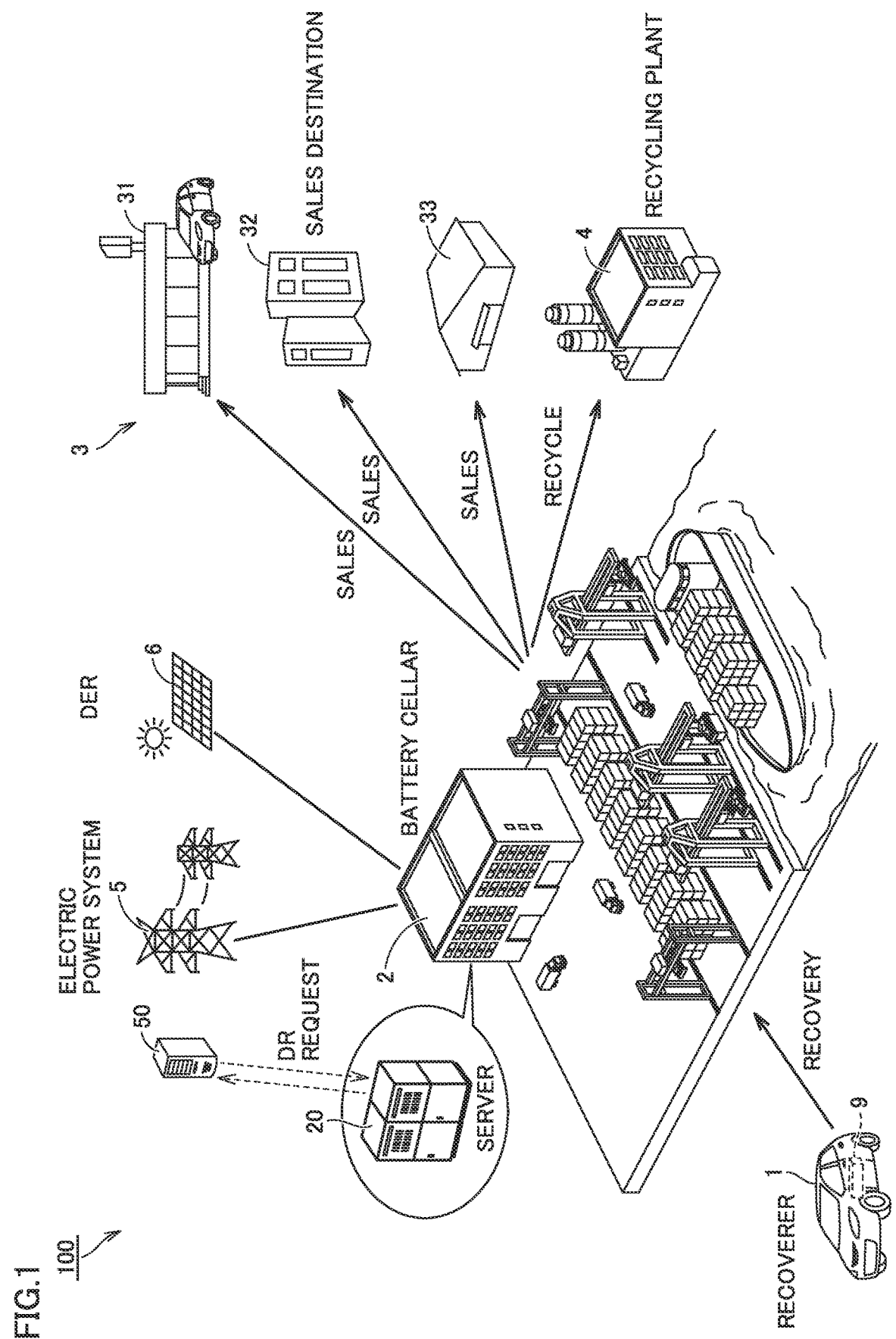
FIG. 1 is a diagram showing an aspect of a physical distribution of an assembled battery according to the present embodiment.

In the present disclosure and embodiments, charging and discharging of a battery means at least one of charging and discharging of the battery. That is, charging and discharging of the battery is not limited to both charging and discharging of the battery, and may be charging of the battery alone or discharging of the battery alone.

In the present disclosure, an assembled battery includes a plurality of modules (also referred to as blocks or stacks). The plurality of modules may be connected in series or may be connected in parallel to each other. Each of the plurality of modules includes a plurality of cells (single cells).

Generally, "reuse" of a battery pack is roughly classified into reuse, rebuild, and material recycling. In the case of reuse, the collected battery pack is shipped as it is as a reuse product after necessary shipping inspection. In the case of rebuilt, the collected battery pack is once disassembled into modules. Then, of the disassembled modules, usable modules (may be modules that can be used after performance recovery) are combined to manufacture a new battery pack. The newly manufactured battery pack is shipped as a rebuilt product after shipping inspection. On the other hand, in the material recycling, a reproducible material (resource) is extracted from each cell. The collected battery pack is not used as another battery pack.

In the embodiments described below, the battery pack recovered from the vehicle is once disassembled into modules. Then, various processes are performed on a module-by-module basis. That is, in the following description, a reusable used battery means a module that can be rebuilt. However, disassembly into modules is not essential. Depending on the configuration of the battery pack or the degree of degradation of the battery pack, reuse can be performed without disassembling the module.

Hereinafter, embodiments of the present disclosure will be described in detail with reference to the drawings. In the drawings, the same or corresponding portions are denoted by the same reference numerals, and the description thereof will not be repeated.

EMBODIMENTS

<Battery Logistics Model>

FIG. 1 is a diagram showing an aspect of a physical distribution of an assembled battery according to the present embodiment. Hereinafter, an embodiment of the physical distribution shown in FIG. 1 will be referred to as a "battery physical distribution model". The battery distribution model 100 includes a recoverer 1, a battery cellar 2, a sales destination 3, a recycling plant 4, an electric power system 5, and a distributed energy resource (DER: Distributed Energy Resource) 6.

The recoverer 1 recovers the used battery pack (the used battery 9) from a plurality of vehicles. The recoverer 1 may be a vehicle dealer or a vehicle disassembly provider. In this example, identification information (battery ID) is assigned to each used battery 9 (see FIG. 5). Therefore, in the battery distribution model 100, the used battery 9 can be specified by using the battery ID, data of the used battery 9 (battery data to be described later, etc.) can be managed, and the distribution path of the used battery 9 can be tracked.

The battery cellar 2 is a facility for appropriately managing the used batteries 9 recovered by the recoverer 1, such as a wine cellar for storing a wine bottle under the control of temperature and humidity. In the example shown in FIG. 1, the battery cellar 2 is installed at a physical distribution base near a port. The battery cellar 2 includes a server 20 for managing data related to the used batteries 9, and a plurality of storage units 21. The battery cellar 2 corresponds to the "battery management system" according to the present disclosure. The storage unit 21 corresponds to a "storage box" according to the present disclosure. The batteries stored in the battery cellar 2 are not limited to the used batteries, and may include new batteries.

Figure 2:
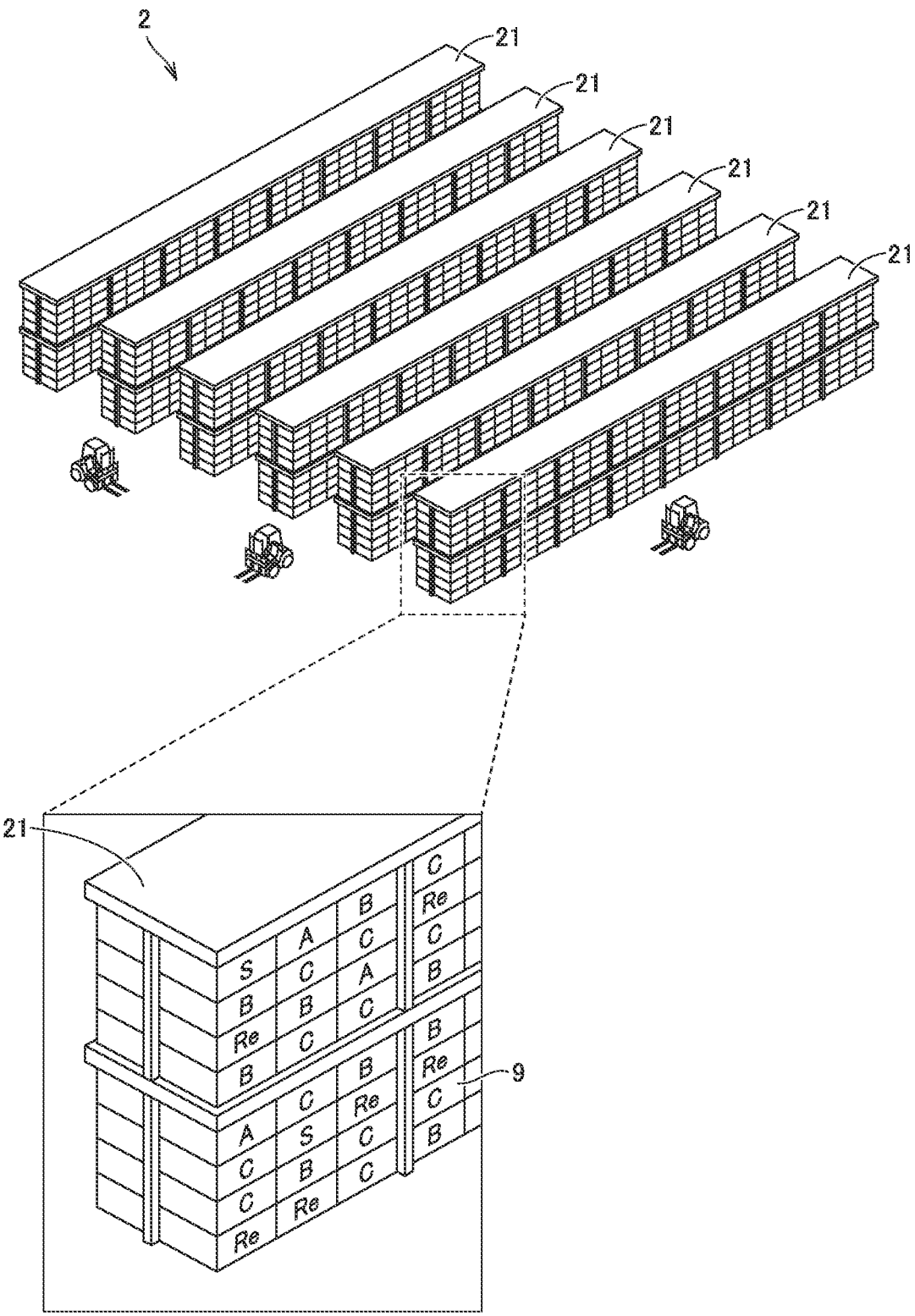
FIG. 2 is a diagram showing an example of a state in which used batteries are stored in a storage unit.

FIG. 2 is a diagram showing an example of a state in which the used battery 9 is stored in the storage unit 21. As shown in FIG. 2, a plurality of storage units 21 are arranged in a building of the battery cellar 2. Each of the plurality of storage units 21 is configured to store a number of used batteries 9. Although details will be described later, in the present embodiment, the battery cellar 2 performs a degradation evaluation test on each of the used batteries 9 stored in the storage unit 21. Then, based on the result of the degradation evaluation test, the battery cellar 2 determines whether each used battery 9 is reusable or not (whether suitable or unsuitable for reuse).

Referring back to FIG. 1, the sales destination 3 sells the used battery 9 determined to be reusable by the battery cellar 2. The sales destination 3 may include a sales store 31 for selling the used batteries 9 as a battery for vehicle, and a user 32 for use as a battery for stationary used in a factory, building, or the like. In addition, the sales destination 3 may include a sales store 33 for selling the used batteries 9 as supplies (replacement parts for maintenance and repair).

The recycling plant 4 performs material recycling for recycling the used battery 9 determined to be unusable by the battery cellar 2 as a raw material of another product.

The electric power system 5 is a power network constructed by power plants, power transmission and distribution facilities, and the like. In this embodiment, the electric power company serves as both a power generation company and a power transmission and distribution company. The electric power company corresponds to a general electric power transmission and distribution company, and also corresponds to an administrator of the electric power system 5 to maintain and manage the electric power system 5. The electric power system 5 is provided with a company server 50. The company server 50 belongs to the electric power company and manages the electric power demand and demand of the electric power system 5. The server 20 and the company server 50 are configured to be capable of two-way communication.

The DER 6 is a relatively small-scale electric power facility which is provided at a physical distribution site (or a peripheral area) where the battery cellar 2 is installed and is capable of transmitting and receiving electric power to and from the battery cellar 2. The DER 6 includes, for example, a power generation type DER and a power storage type DER.

The power generation DER may include a natural variable power source and a generator. The natural variable power source is a power generation facility in which the power generation output varies depending on weather conditions. Although a solar power generation facility (a solar panel) is illustrated in FIG. 1, the natural variable power source may include a wind power generation facility instead of or in addition to the solar power generation facility. On the other hand, the generator is a power generation facility independent of weather conditions. The generator may include a steam turbine generator, a gas turbine generator, a diesel engine generator, a gas engine generator, a biomass generator, a stationary fuel cell, etc. The generator may include a cogeneration system that utilizes heat generated during power generation.

The storage DER may include a power storage system and a heat storage system. The power storage system is a stationary power storage device that stores electric power generated by a natural variable power source or the like. The power storage system may be a power to gas device that uses electrical power to produce gaseous fuels (hydrogen, methane, etc.). The heat storage system includes a heat storage tank provided between a heat source and a load, and is configured to temporarily store a liquid medium in the heat storage tank in a heat-retaining state. Heat storage systems can be used to temporally offset the generation and consumption of heat. Therefore, for example, heat generated by operating the heat source device by consuming electric power during nighttime can be stored in the heat storage tank, and air conditioning can be performed by consuming the heat during daytime.

As described above, the used batteries 9 recovered by the recoverer 1 are stored in the battery cellar 2 while waiting for delivery to the sales destination 3 or the recycling plant 4. However, maintenance cost (running cost) is also required to appropriately store the used batteries 9 using the battery cellar 2. Further, a certain amount of time may be required between the entry of the recovered used battery 9 and the entry to the sales destination 3 or the recycling plant 4. Therefore, it is desirable to effectively utilize the storage period of the used battery 9 in the battery cellar 2.

In the present embodiment, the battery cellar 2 functions as a virtual power plant (VPP) in addition to the storage location of the used batteries 9. Thus, the opportunity for the used battery 9 to charge and discharge serves both as a degradation evaluation of the used battery 9 for determining the reuse mode of the used battery 9 and as a power demand balance adjustment of the electric power system 5 using the used battery 9. As a result, in the battery cellar 2, the storage of the used battery 9, the evaluation of degradation of the used battery 9, and the adjustment of the power demand and demand balance by the used battery 9 are performed in a "three-level integrated" manner.

<Reusing Battery>

Figure 3:
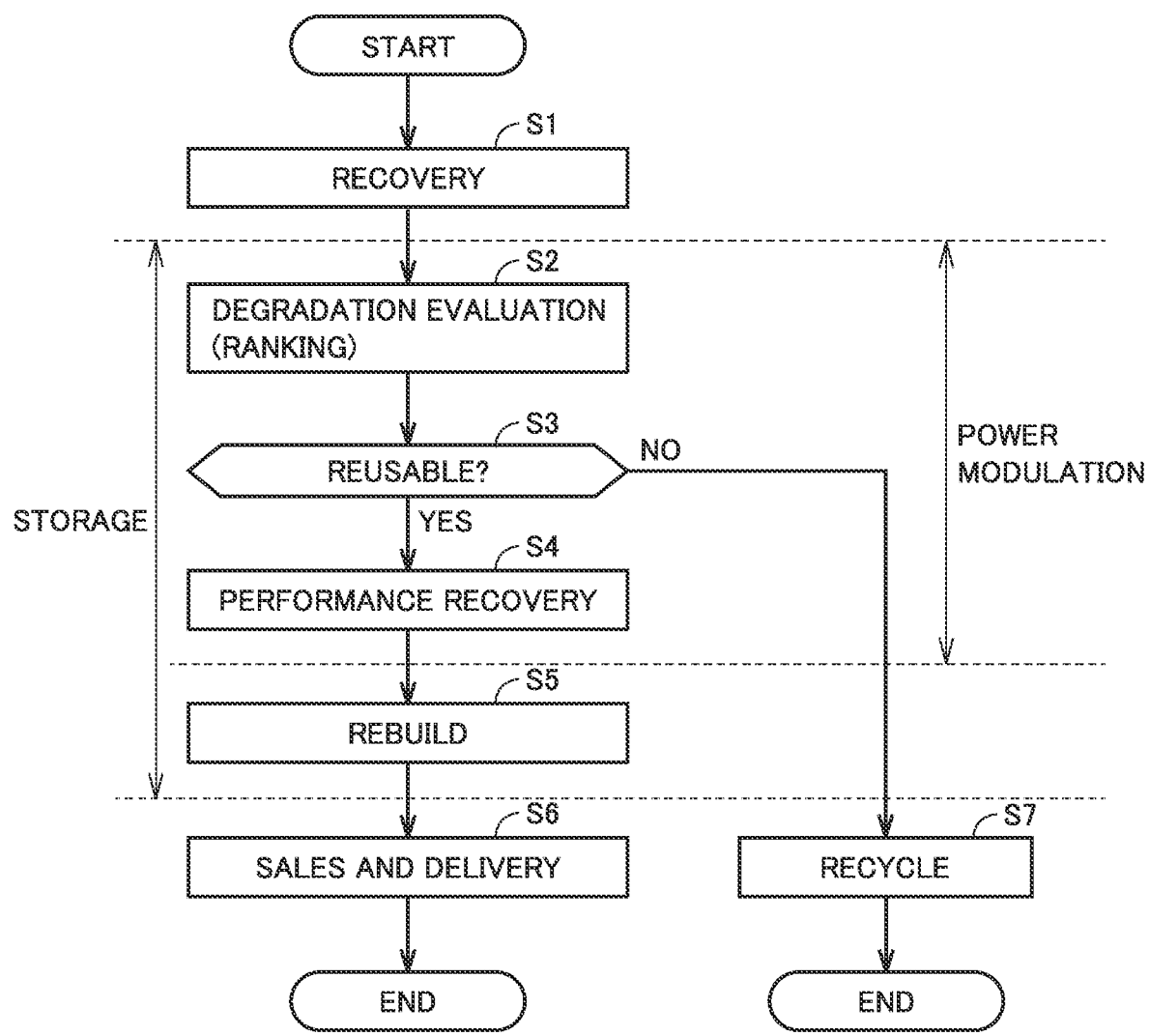
FIG. 3 is a flowchart showing an outline of a working process for reusing a used battery.

FIG. 3 is a flowchart showing an outline of a working process for reusing the used battery 9. First, the used battery 9 recovered by the recoverer 1 is delivered to the battery cellar 2 (S1).

In the present embodiment, the server 20 performs a degradation evaluation test (performance test) on each of the used batteries 9 in a state of being stored in the storage unit 21 (S2). The server 20 evaluates the degree of degradation of each used battery 9 based on electrical characteristics such as full charge capacity and internal resistance (e.g., AC impedance). Then, the server 20 determines whether each used battery 9 is reusable or not based on the result of the degradation evaluation test (S3).

In the present embodiment, ranking of the used batteries 9 is performed in accordance with the result of the degradation evaluation test (more specifically, the measurement result of the full charge capacity). For example, as shown in FIG. 2, the used batteries 9 capable of rebuilding are ranked in four levels of S rank, A rank, B rank, and C rank in descending order of full charge capacity. Thus, the trade price of the used battery 9 can be set in association with the rank, and the quality of the used battery 9 can be guaranteed according to the rank. Therefore, the used batteries 9 passed through the battery cellar 2 can be smoothly distributed to the market. The used battery 9 whose full charge capacity is less than the specified value is ranked lower than the C rank (represented as Re), and is recycled to the material.

When it is determined that reuse is possible (YES in S3), the working process proceeds to the performance recovery process (S4). In the performance recovery step, a process (performance recovery process) for recovering the performance of the used battery 9 is performed. For example, the fully charged capacity of the used battery 9 can be recovered by overcharging the used battery 9. However, the performance recovery step may be omitted. In addition, as a result of the degradation evaluation test, the performance recovery process may be performed on the used battery 9 having a large degree of degradation (the performance is greatly reduced), whereas the performance recovery process may not be performed on the used battery 9 having a small degree of degradation (the performance is not so reduced).

Subsequently, a new assembled battery is manufactured (rebuilt) using the used battery 9 whose performance has been recovered by the performance recovery step (S5). The used battery 9 used for rebuilding the battery pack is basically a used battery 9 whose performance is recovered through a performance recovery step, but may include a used battery 9 in which the performance recovery step is omitted, or may include a new battery (a new module). Thereafter, the battery pack is sold and shipped to the sales destination 3 (S6).

As a result of the degradation evaluation test, when it is determined that reuse is impossible (NO in S3), the used battery 9 is transported to the recycling plant 4 (S7). In the recycling plant 4, the used batteries 9 are disassembled and re-resourced.

As described above, the used battery 9 is stored in the battery cellar 2 until it is recovered by the recoverer 1 and transferred to the sales destination 3 or the recycling plant 4, during which the degradation evaluation test is performed. When measuring electrical characteristics such as full charge capacity of the used battery 9 in the degradation evaluation test, the used battery 9 is charged and discharged. In the present embodiment, electric power transmitted and received between the battery cellar 2 (and DER6) and the electric power system 5 is used for the charging and discharging. Thus, the battery cellar 2 functions as a VPP (or one of DERs) and contributes to load leveling of the electric power system 5. More specifically, during a time period during which the electric power system 5 has a supply excess with respect to demand, the battery cellar 2 absorbs the power excess by charging the used battery 9 with the excess power. On the other hand, when a shortage of power is generated in the electric power system 5 in response to demand, the battery cellar 2 discharges the shortage of power from the used battery 9, thereby reducing the shortage of power.

However, the battery cellar 2 may not be configured to contribute to both the absorption of the excess power and the mitigation of the shortage of the power in the electric power system 5. The battery cellar 2 may be configured to contribute to only one of the absorption of power excess and the mitigation of power deficiency. For example, the battery cellar 2 may charge the used battery 9 with the excess electric power in the electric power system 5, and may not include the electric power system 5 at the discharge destination from the used battery 9. The discharge destination from the used battery 9 may be, for example, only the DER 6.

<System Configuration of Battery Cellar>

Figure 4:
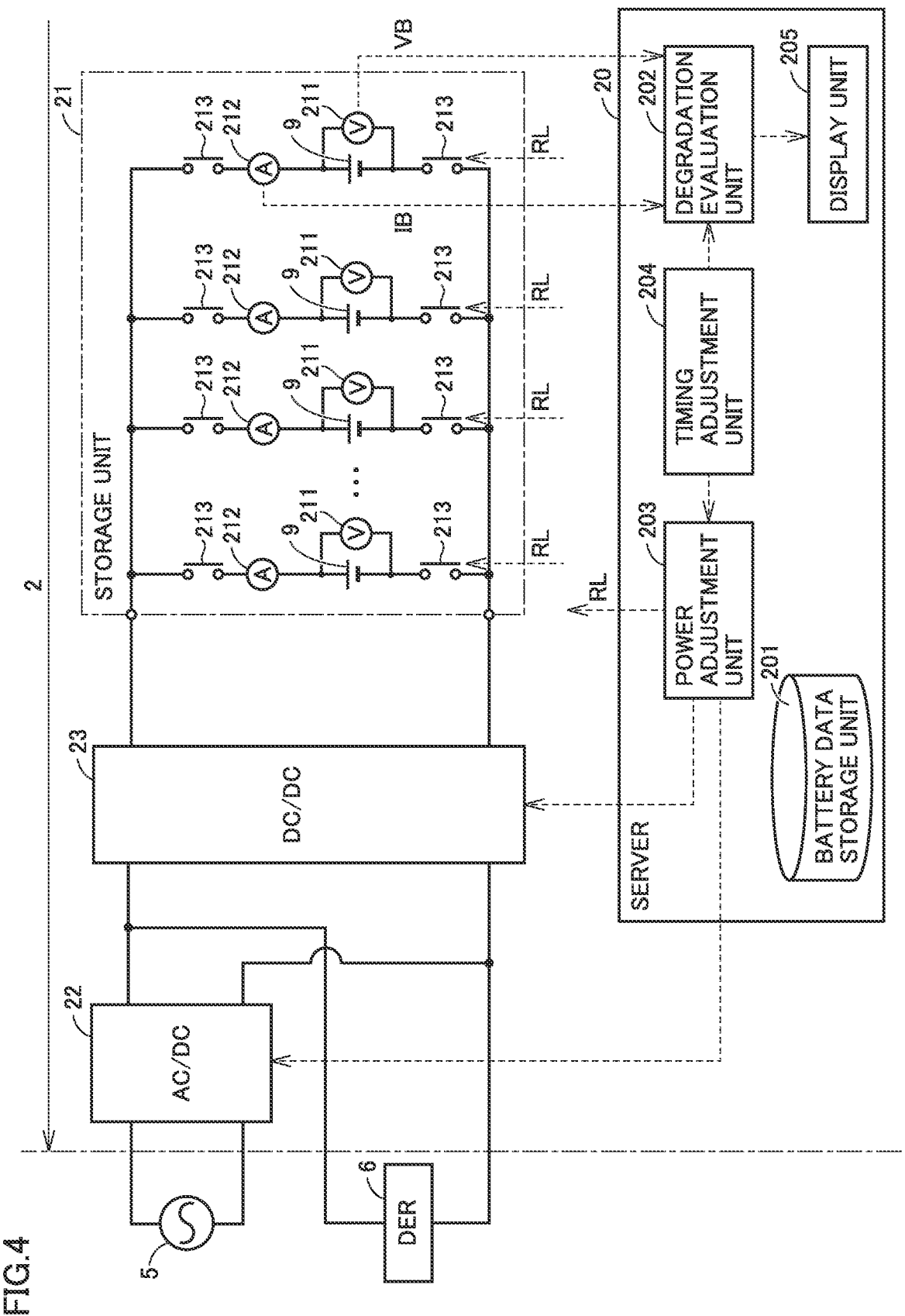
FIG. 4 is a system configuration diagram showing an electrical configuration of a battery cellar.

FIG. 4 is a system configuration diagram showing an electrical configuration of the battery cellar 2. The battery cellar 2 includes, for example, a storage unit 21, an AC/DC converter 22, a DC/DC converter 23, and a server 20. Although only one storage unit 21 is shown in FIG. 4 for convenience of paper, a typical battery cellar 2 includes a plurality of storage units 21 as shown in FIG. 2.

The storage unit 21 stores a plurality of used batteries 9. Although the plurality of used batteries 9 are connected in parallel to each other in FIG. 4, this is merely an example, and the connection mode of the plurality of used batteries 9 is not particularly limited. The plurality of used batteries 9 may be serially connected, or a combination of serial connection and parallel connection may be used. The storage unit 21 includes a voltage sensor 211, a current sensor 212, and a relay 213.

The voltage sensor 211 detects the voltage VB of the used battery 9, and outputs the detected value to the server 20. The current sensor 212 detects the current IB charged and discharged to and from the used battery 9, and outputs the detected value to the server 20. When the temperature is used for the degradation evaluation of the used battery 9, the storage unit 21 may further include a temperature sensor (not shown). Each sensor may be a sensor provided in the used battery 9.

The relay 213 includes, for example, a first relay electrically connected to the positive electrode side of the used battery 9 and a second relay electrically connected to the negative electrode side of the used battery 9. The relay 213 is configured to switch between electrical connection and disconnection between the used battery 9 and the electric power system 5. Thus, an arbitrary used battery 9 can be electrically disconnected even during charging and discharging of another used battery 9, and the used battery 9 can be taken out of the storage unit 21. The relay 213 corresponds to the "switching device" according to the present disclosure.

The AC/DC converter 22 is electrically connected between the electric power system 5 and the DC/DC converter 23. The AC/DC converter 22 is configured to be able to perform a bidirectional power conversion operation for charging and discharging the used battery 9 stored in the storage unit in accordance with a control command (charging and discharging command) from the server 20. More specifically, the AC/DC converter 22 converts AC power supplied from the electric power system 5 into DC power for charging the used battery 9. The AC/DC converter 22 converts DC power discharged from the used battery 9 into AC power to be supplied to the electric power system 5.

The DC/DC converter 23 is electrically connected between the AC/DC converter 22 and the storage unit 21, and is electrically connected between the DER 6 and the storage unit 21. Like the AC/DC converter 22, the DC/DC converter 23 is configured to be able to perform bidirectional power conversion operation in accordance with a control command (charge/discharge command) from the server 20. The DC/DC converter 23 charges the used battery 9 with DC power from the AC/DC converter 22 and/or the DER 6, and discharges DC power stored in the used battery 9 to the AC/DC converter 22 and/or the DER 6.

The server 20 includes a processor such as a CPU (Central Processing Unit), a memory such as a ROM (Read Only Memory) and a RAM (Random Access Memory), and input/output ports (none of which are shown) through which various signals are input/output. The server 20 performs various controls based on signals received from the sensors and programs and maps stored in the memory. The server 20 includes a battery data storage unit 201, a degradation evaluation unit 202, a power adjustment unit 203, a timing adjustment unit 204, and a display unit 205.

The battery data storage unit 201 stores battery data used for managing the used batteries 9 in the battery cellar 2.

Figures 5, 6:
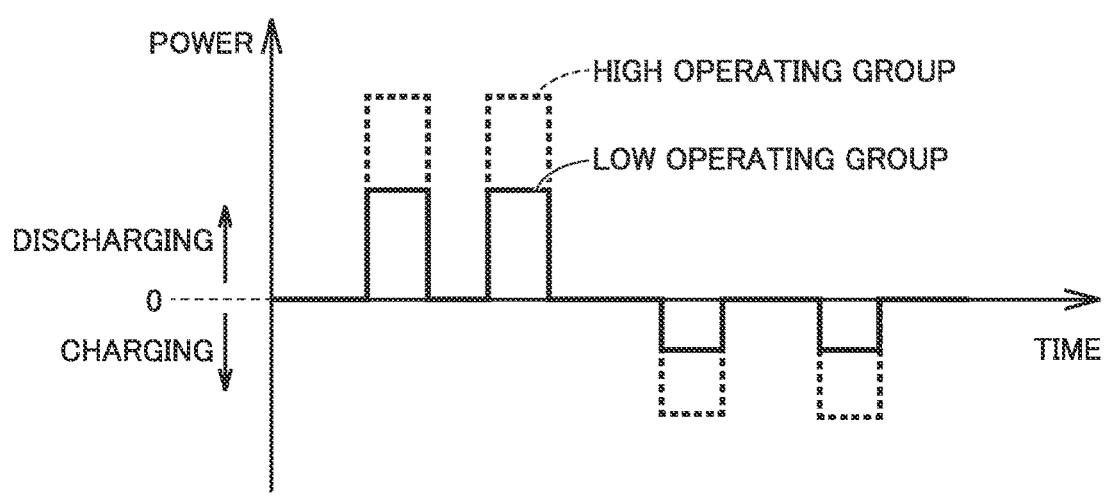
FIG. 5 is a diagram showing an example of a data structure of battery data.
FIG. 6 is a conceptual diagram for explaining an example of a mode of suppressing charging and discharging of the used battery according to the present embodiment.

FIG. 5 is a diagram showing an example of a data structure of battery data. The battery data is stored in a map format, for example. The battery data includes, as parameters, for example, identification information (battery ID) for identifying the used battery 9, a model number of the used battery 9, a manufacturing date, a current SOC (State Of Charge), a full charge capacity, a rank, a degradation evaluation date and time (the latest date and time at which the degradation evaluation test is performed), and a storage position (identification information of a storage unit in which the used battery 9 is stored). The battery data may include other parameters (The internal resistance of the used battery 9, the index $\Sigma D$ indicating the deviation of the salt concentration distribution in the electrolytic solution of the used battery 9, and the like.).

Referring again to FIG. 4, the degradation evaluation unit 202 performs a degradation evaluation test of the used battery 9 based on the voltage VB and the current IB detected by the voltage sensor 211 and the current sensor 212 respectively when the used battery 9 is charged and discharged. An example of this evaluation method will be described with reference to FIG. 12. The degradation evaluation unit 202 ranks the used batteries 9 based on the result of the degradation evaluation test.

The power adjustment unit 203 adjusts the power between the battery cellar 2 (and DER6) and the electric power system 5. More specifically, the server 20 selects the used battery 9 to be charged and discharged in order to respond to a demand response (DR) request from the company server 50 (see FIG. 1) from the plurality of used batteries 9. The power adjustment unit 203 outputs commands to the relay 213, the AC/DC converter 22 and the DC/DC converter 23 so that the selected used battery 9 is charged and discharged. An example of this control method will be described with reference to FIG. 13.

The timing adjustment unit 204 adjusts the timing of the degradation evaluation test of the used battery 9 by the degradation evaluation unit 202 and the timing of the power adjustment between the battery cellar 2 and the electric power system 5 by the power adjustment unit 203. More specifically, the timing adjustment unit 204 performs the timing adjustment so that the degradation evaluation test of the used battery 9 is performed in synchronization with the timing at which the battery cellar 2 performs DR in response to the DR request from the company server 50. It should be noted that the operation performed in accordance with the DR of the battery cellar 2 is not limited to the degradation evaluation test of the used battery 9. In addition to the degradation evaluation test, performance recovery processing (see S4 in FIG. 3) may be performed.

The display unit 205 displays battery data (see FIG. 5) in response to an operation of an administrator of the battery cellar 2 (which may be a worker working on the battery cellar 2). The display unit 205 also displays progress and results of the degradation evaluation test performed by the degradation evaluation unit 202. Thus, the administrator can grasp the condition of the degradation evaluation test. Further, the display unit 205 displays the state of the used battery 9 selected and charged and discharged by the power adjustment unit 203. As a result, the administrator can grasp the condition of the power adjustment between the battery cellar 2 and the electric power system 5.

The server 20 corresponds to the "control device" according to the present disclosure. The AC/DC converter 22 and the DC/DC converter 23 correspond to the "power converter" according to the present disclosure.

<Inventory Reservation>

The required rank varies depending on the application of reuse or the like. Therefore, there is a possibility that a rank having a relatively high demand exists while a rank having a relatively low demand exists. It is desirable that a number of used batteries 9 corresponding to the demand for reuse be secured as inventory in the battery cellar 2 for each rank. On the other hand, the battery cellar 2 cannot adjust the rank of the used batteries 9 to be recovered from the market. In addition, degradation of the used batteries 9 progresses even during the storage period in the battery cellar 2, which may lower the rank. In particular, in the battery cellar 2, since the used batteries 9 are repeatedly charged and discharged in order to adjust the power to and from the electric power system 5, degradation of the used batteries 9 tends to progress. This may cause a bias in the rank of the stock used batteries 9.

Therefore, in the present embodiment, the battery group including the plurality of used batteries 9 includes a low operating group and a high operating group in which the number of types of ranks (In this embodiment, a rank of any of S, A to C ranks is used.) included is less than or equal to the low operating group, and the server 20 suppresses charging and discharging of the used batteries 9 in the low operating group as compared with charging and discharging of the used batteries 9 in the high operating group. Thus, the rank of the used batteries in each rank included in the low operating group is maintained as compared with the rank of the used batteries included in the high operating group. As a result, the stock of the used batteries in each rank can be secured.

As compared with the high operating group, it is desirable that the low operating group includes the used batteries of all ranks equally, but it may not be completely equal, and for example, the used batteries of each rank may be included at a ratio approximately equal to the ratio of each rank in all the battery groups, or the used batteries of all ranks may be included so that the number of used batteries of each rank becomes equal to or more than the minimum number of batteries secured as inventory. The low operating group includes the used batteries of all ranks, but the high operating group may include the used batteries of all ranks or may not include the used batteries of all ranks. Although it is desirable that the low operating group includes the types of all ranks, the low operating group may not include the types of all ranks as long as the low operating group includes the types of ranks equal to or more than the number of types of ranks included in the high operating group.

Figure 7:
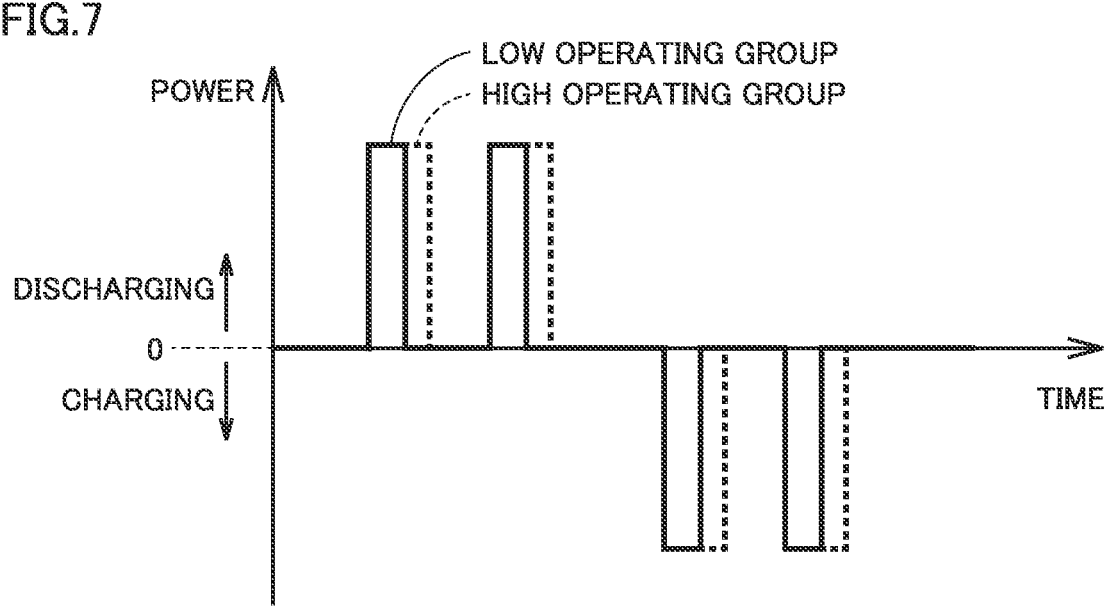
FIG. 7 is a conceptual diagram for explaining another example of a mode of suppressing charging and discharging of the used battery according to the present embodiment.
Figure 8:
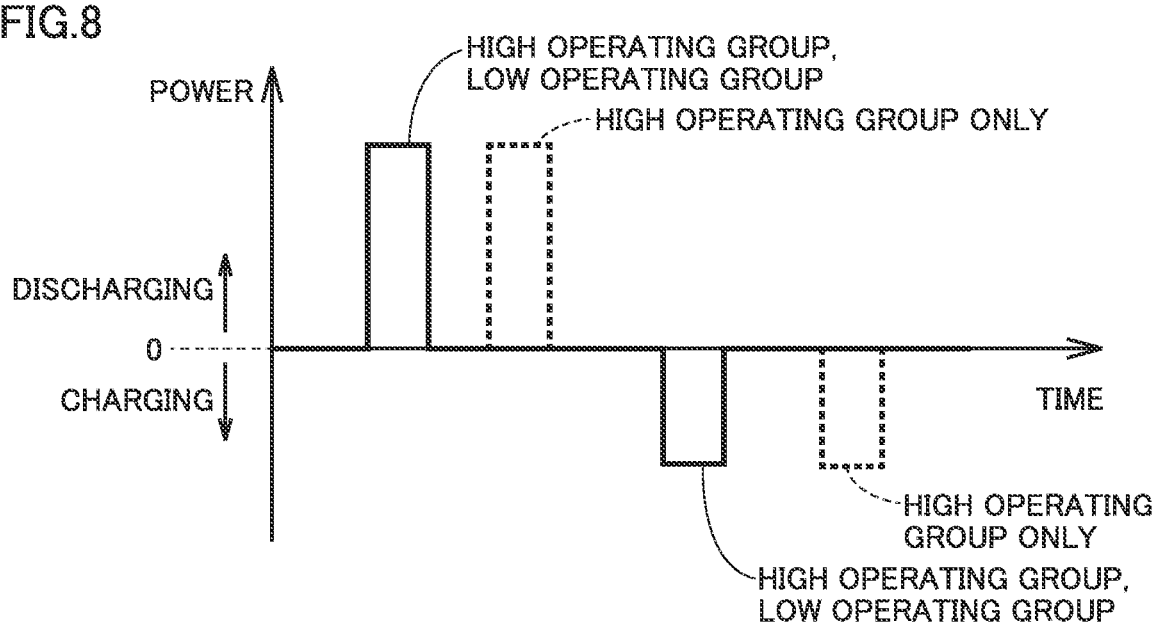
FIG. 8 is a conceptual diagram for explaining still another example of a mode of suppressing charging and discharging of the used battery according to the present embodiment.

FIG. 6 is a conceptual diagram for explaining an example of a mode of suppressing charging and discharging of the used battery 9 in the present embodiment. FIG. 7 is a conceptual diagram for explaining another example of a mode of suppressing charging and discharging of the used battery 9 in the present embodiment. FIG. 8 is a conceptual diagram for explaining still another example of a mode of suppressing charging and discharging of the used battery 9 in the present embodiment. In FIGS. 6 to 8, the horizontal axis represents elapsed time. The vertical axis represents the power charged and discharged from the battery cellar 2 (the used battery 9) to and from the electric power system 5.

As shown in FIG. 6, the charge/discharge amount (the amount of electric power charged/discharged) of the used batteries 9 of the low operating group within a predetermined period can be made smaller than the charge/discharge amount of the used batteries 9 of the high operating group within a predetermined period (first control). Here, the method of decreasing the charge/discharge amount within the predetermined period is not limited to the method of adjusting the magnitude (e.g., peak value) of the charge/discharge power (see FIG. 6), and the length of the charge/discharge period may be adjusted as shown in FIG. 7. It is also possible to adjust both the magnitude of the charge/discharge power and the length of the charge/discharge period. As shown in FIG. 8, the charge/discharge frequency of the used batteries 9 in the low operating group may be lower than the charge/discharge frequency of the used batteries 9 in the high operating group (second control). Although not shown, both the charge/discharge amount and the charge/discharge frequency of the used batteries 9 in the low operating group may be suppressed as compared with those of the used batteries 9 in the high operating group. That is, the first control and the second control may be used in combination.

<Suppression Flow of Charge and Charge>

Figure 9:
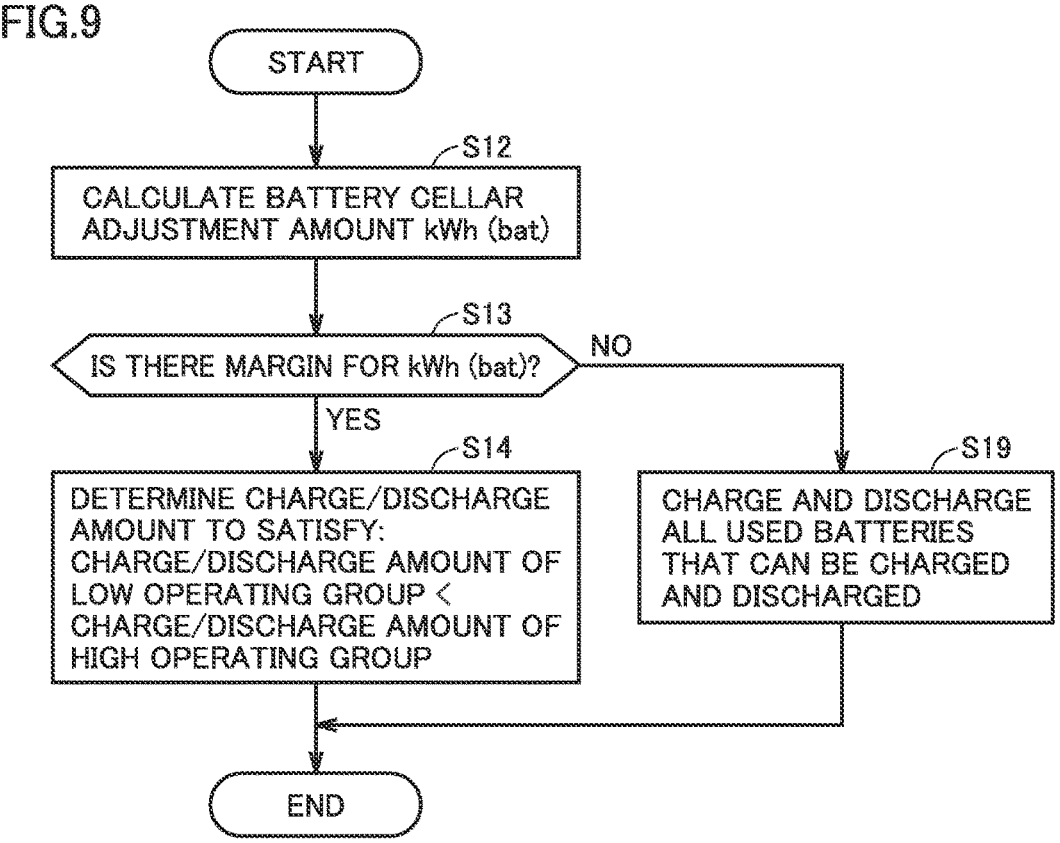
FIG. 9 is a flowchart showing a first example of a processing procedure relating to charge and discharge suppression in the present embodiment.

FIG. 9 is a flowchart showing a first example of a processing procedure relating to charge and discharge suppression in the present embodiment. This flowchart (and other flowcharts described later) is called from a main routine (not shown) and executed when a predetermined condition is satisfied. Each step is realized by software processing by the server 20, but may be realized by hardware (electrical circuit) arranged in the server 20. Hereinafter, this step is abbreviated as S.

In S12, the server 20 calculates the amount of electric power required to adjust the electric power between the battery cellar 2 and the electric power system 5 using the battery cellar 2. This amount of electric power is hereinafter referred to as battery cellar adjustment amount, and is also referred to as kWh (bat). An example of a method of calculating the battery cellar adjustment amount kWh (bat) will be described in detail with reference to FIG. 10.

In S13, the server 20 determines whether or not there is a margin in the total amount of electric power that can be charged and discharged using all the used batteries 9 with respect to the battery cellar adjustment amount kWh (bat). When the battery cellar adjustment amount kWh (bat) is greater than or equal to the amount of electric power that can be charged and discharged using all the used batteries 9, the server 20 determines that there is no margin. If there is no margin (NO in S13), it is required to charge and discharge all the used batteries 9 in order to make the amount of electric power charged and discharged by the battery cellar 2 closer to the battery cellar adjustment amount ΔkWh (bat). Accordingly, the server 20 charges and discharges all the used batteries 9 (S19).

On the other hand, when there is a margin, that is, when the battery cellar adjustment amount kWh (bat) is smaller than the amount of electric power that can be charged and discharged using all the used batteries 9 (YES in S13), the battery cellar adjustment amount ΔkWh (bat) can be satisfied without charging and discharging all the used batteries 9. In this case, the server 20 determines the charge/discharge amount of the used batteries 9 of the low operating group to be smaller than the charge/discharge amount of the used batteries 9 of the high operating group (S14).

Figure 10:
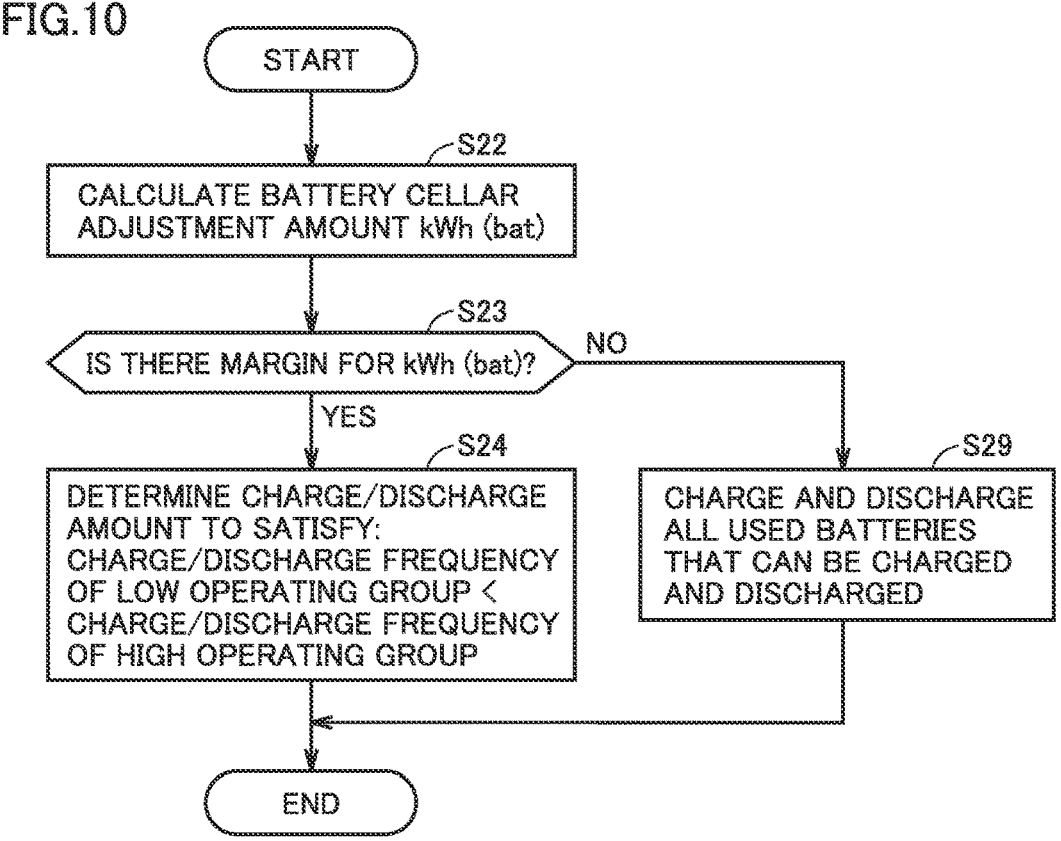
FIG. 10 is a flowchart showing a second example of a processing procedure relating to charge and discharge suppression in the present embodiment.

FIG. 10 is a flowchart showing a second example of a processing procedure relating to charge and discharge suppression in the present embodiment. Since the processes of S22, S23, and S29 are the same as the processes of S12, S13, and S19 shown in FIG. 9, the description thereof will not be repeated. As shown in FIG. 10, the server 20 may determine the charge/discharge frequency of the used batteries 9 of the low operating group to be lower than the charge/discharge frequency of the used batteries 9 of the high operating group (S24).

As described above, with respect to the used batteries 9 in the low operating group, degradation due to charging and discharging can be suppressed by decreasing the charging and discharging amount for adjusting the power and decreasing the charging and discharging frequency as compared with the used batteries 9 in the high operating group. Thus, the rank of the used batteries 9 in each rank included in the low operating group is maintained as compared with the rank of the used batteries 9 included in the high operating group. As a result, the stock of the used batteries 9 in each rank can be sufficiently secured.

Figure 11:
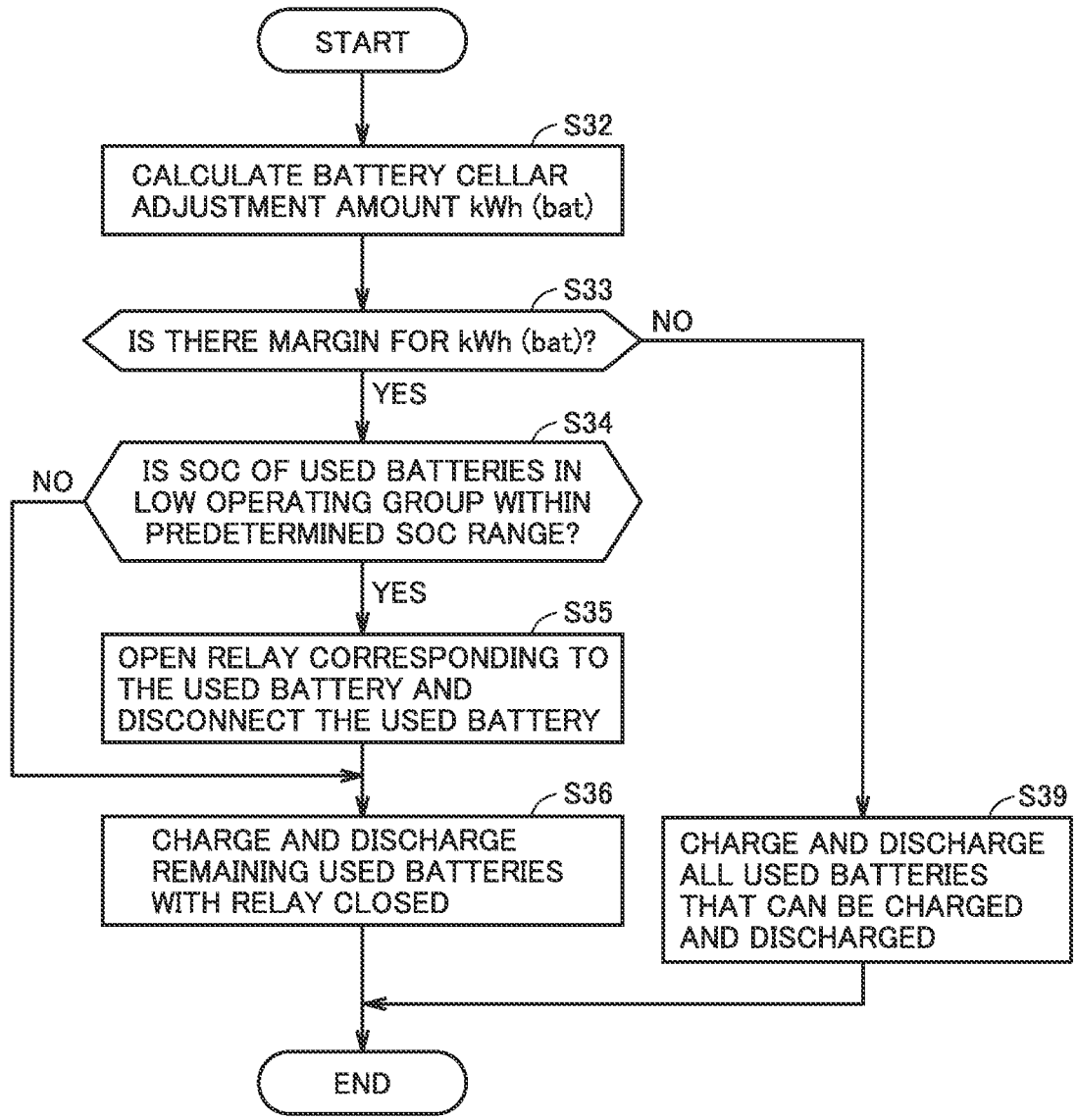
FIG. 11 is a flowchart showing a third example of a processing procedure relating to charge and discharge suppression in the present embodiment.

FIG. 11 is a flowchart showing a third example of a processing procedure relating to charge and discharge suppression in the present embodiment. Since the processes of S32, S33, and S39 are the same as the processes of S12, S13, and S19 shown in FIG. 9, the description thereof will not be repeated. When the total amount of electric power that can be charged and discharged using all the used batteries 9 has a margin with respect to the battery cellar adjustment amount kWh (bat) (YES in S33), the server 20 advances the process to S34.

In S34, for each used battery 9 of the low operating group, it is determined whether the SOC of the used battery 9 is within a predetermined SOC range. The SOC range is a range in which degradation of the used battery 9 progresses moderately, and is determined in advance according to the characteristics of the used battery 9. Generally, when the SOC of the secondary battery is excessively high (for example, more than 80%) or excessively low (for example, less than 20%), degradation of the secondary battery tends to progress. Therefore, the SOC range is preferably an intermediate SOC range (for example, an SOC range of 40% to 60%).

When the SOC of a certain used battery 9 among the used batteries 9 of the low operating group is within the range of the SOC in which the progress of degradation is moderate (YES in S34), the server 20 opens the relay 213 corresponding to the used battery 9 so that the used battery 9 is electrically disconnected from the electric power system 5 (S35).

If the number of used batteries 9 electrically disconnected from the electric power system 5 is too large, the amount of power charged and discharged from the battery cellar 2 may be insufficient with respect to the battery cellar adjustment amount kWh (bat). Therefore, the server 20 desirably considers the battery cellar adjustment amount kWh (bat) when controlling the relay 213. That is, the server 20 preferably adjusts the number of used batteries 9 electrically disconnected from the electric power system 5 so that the number of used batteries 9 required to satisfy the battery cellar adjustment amount kWh (bat) remains electrically connected to the electric power system 5.

In S36, the server 20 charges and discharges the remaining used batteries 9 in which the relay 213 is closed and the used batteries 9 in the high operating group, thereby performing power adjustment with the electric power system 5. The remaining used batteries 9 in which the relay 213 is closed are the remaining used batteries 9 which remain electrically connected to the electric power system 5 among the used batteries 9 in the low operating group. That is, the remaining used batteries 9 in which the relay 213 is closed are used batteries 9 in which the SOC is outside the range of the SOC in which the degradation progresses moderately. The higher the temperature of the used battery 9, the more likely the used battery 9 is degraded. Accordingly, the server 20 may impose a certain limit on the charging/discharging current so that the used battery 9 does not become excessively high in temperature due to heat generated by charging/discharging.

In this way, the used battery 9 electrically disconnected from the electric power system 5 by opening the relay 213 is not used for charging and discharging for power adjustment, so that degradation due to charging and discharging can be suppressed. In addition, the SOC of the used battery 9 electrically disconnected from the electric power system 5 is maintained within the SOC range in which the progress of degradation is moderate. Thus, degradation during storage (so-called aging degradation or material degradation) which is not caused by charging and discharging can also be suppressed.

The process of S34 can also be applied to the flowchart of FIG. 9 and/or FIG. 10. When the SOC of the used batteries 9 is within the range in which the progress of degradation is moderate, the server 20 can reduce the charge/discharge amount or the charge/discharge frequency of the used batteries 9 in the low operating group.

In any of the examples shown in FIGS. 9 to 11, the server 20 may suppress charging and discharging of the used battery 9 whose sales destination is determined as compared with charging and discharging of the used battery 9 of the same rank in which the sales destination is not determined. In other words, the server 20 may suppress charging and discharging of the used batteries 9 whose sales destinations are determined even if the used batteries 9 of the high operating group are used. As a result, the progress of degradation during the storage period until sale of the used battery 9 can be suppressed, so that it is possible to prevent a decrease in rank from a point in time when the sale destination is determined.

<Degradation Evaluation>

Figure 12:
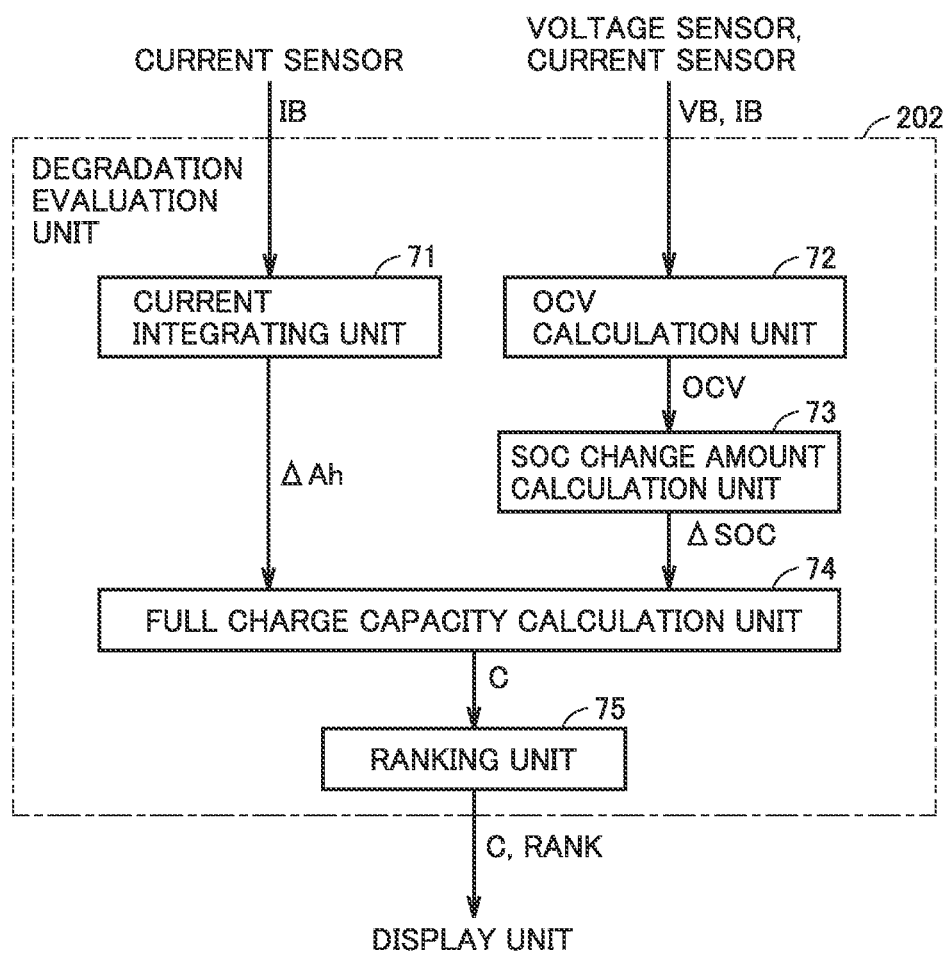
FIG. 12 is a functional block diagram of a server relating to degradation evaluation of a used battery.

FIG. 12 is a functional block diagram of the server 20 (degradation evaluation unit 202) relating to degradation evaluation of the used battery 9. Hereinafter, in order to simplify the description, a description will be given focusing on one used battery 9. However, in reality, when there are a plurality of used batteries 9 whose degradation evaluation has not been performed, the same process can be performed simultaneously on those used batteries 9. The degradation evaluation unit 202 includes a current integration unit 71, an open circuit voltage (OCV) calculation unit 72, an SOC change amount calculation unit 73, a full charge capacity calculation unit 74, and a ranking unit 75.

Based on the current IB detected by the current sensor 212, the current integration unit 71 calculates an integrated value (current integrated amount) ΔAh (unit: Ah) of the current charged and discharged to and from the used battery 9 during a period from when the start condition of current integration is satisfied to when the end condition is satisfied. In the present embodiment, as described above, charging and discharging of the used battery 9 is performed in response to the DR request from the company server 50, and the current flowing during the DR is integrated. More specifically, when the increase DR (power demand increase request) is performed, the used battery 9 is charged in order to increase the power demand of the battery cellar 2, and the charging current at that time is integrated. On the other hand, when the reduction DR is performed, the used battery 9 is discharged in order to reduce the power demand of the battery cellar 2, and the discharge current at that time is integrated. The current integration unit 71 outputs the calculated current integration amount ΔAh to the full charge capacity calculation unit 74.

The OCV calculation unit 72 calculates the OCV of the used battery 9 at the start of current integration and the OCV of the used battery 9 at the end of current integration. The OCV can be calculated, for example, according to the following equation (1).

$$OCV = VB - \Delta Vp - IB \times R \quad (1)$$

In Expression (1), the internal resistance of the used battery 9 is described as R, and the polarization voltage is described as Vp. At the start of current integration (immediately before the start of charging and discharging), current IB=0. Further, when the used battery 9 is left uncharged and discharged before the current integration is started, the polarization voltage Vp can be approximated to 0. Therefore, the OCV at the start of current integration can be calculated based on the voltage VB detected by the voltage sensor 211. On the other hand, the internal resistance R can be specified from the relationship (ohm's law) between the voltage VB and the current M. When the charge/discharge of the used battery 9 is performed at a constant current, the polarization voltage Vp can also be specified from the current M detected by the current sensor 212 by measuring the relationship between the current and the polarization voltage Vp in advance. Therefore, the OCV of the used battery 9 at the end of the current integration can also be calculated based on the voltage VB and the current M. The OCV calculation unit 72 outputs the calculated two OCVs to the SOC change amount calculation unit 73.

The SOC change amount calculation unit 73 calculates the SOC change amount ΔSOC of the used battery 9 from the start of the current integration to the end of the current integration based on the two OCVs. The SOC change amount calculation unit 73 has a characteristic curve (OCV-SOC curve) indicating SOC dependence of OCV in advance. Accordingly, the SOC change amount calculation unit 73 can read the SOC corresponding to the OCV at the start of current integration and the SOC corresponding to the OCV at the end of current integration by referring to the OCV-SOC curve, and calculate the difference between these SOCs as ΔSOC. The SOC change amount calculation unit 73 outputs the calculated ΔSOC to the full charge capacity calculation unit 74.

Full charge capacity calculation unit 74 calculates full charge capacity C of used battery 9 based on ΔAh from current integration unit 71 and ΔSOC from SOC change amount calculation unit 73. More specifically, the full charge capacity C of the used battery 9 can be calculated according to the following expression (2) where the ratio of ΔAh to ΔSOC is equal to the ratio of ΔSOC=100% to the full charge capacity C. Since the full charge capacity C0 in the initial state is known from the specifications of the used battery 9, the full charge capacity calculation unit 74 may further calculate the capacity maintenance ratio Q from the full charge capacity C (Q=C/C0). Full charge capacity calculation unit 74 outputs calculated full charge capacity C to ranking unit 75.

$$C = Ah/\Delta SOC \times 100 \quad (2)$$

The ranking unit 75 ranks the used batteries 9 according to the full charge capacity C. The ranking unit 75 can record the date and time of ranking as the degradation evaluation date and time in the battery data (see FIG. 5).

The rank of the used battery 9 is displayed on the display unit 205 together with the battery ID and the storage position of the used battery 9. As a result, when a request to purchase the used battery 9 is received from the sales destination 3, the worker working on the battery cellar 2 can take out the used battery 9 having a rank corresponding to the request of the sales destination 3 from the storage position. By appropriately taking out the used batteries to be sold from the storage unit 21, it is possible to suppress a situation in which the storage unit 21 is free from space. The method of calculating the full charge capacity C is merely an example.

Any method can be employed for calculating the full charge capacity C as long as the method uses the voltage VB and the current IB detected along with the charging and discharging of the used battery 9. The ranking unit 75 may determine the rank of the used battery 9 based on another characteristic (The internal resistance R of the used battery 9, the index ΣD indicating the deviation of the electrolytic solution concentration in the lithium ion battery, and the like.) instead of or in addition to the full charge capacity C. The ranking unit 75 may determine the rank of the used battery 9 in accordance with the length of time during which the used battery 9 is charged and discharged and/or the number of times the used battery 9 is charged and discharged. The ranking unit 75 may determine the rank of the used battery 9 in accordance with the elapsed time since the manufacture of the used battery 9, although the accuracy may decrease to some extent. The ranking unit 75 may determine the rank of the used battery 9 by combining the above elements (Full charge capacity C, internal resistance R, index ΣD, charge/discharge time, number of times of charge/discharge, elapsed time from manufacture, etc.).

<Power Modulation>

Figure 13:
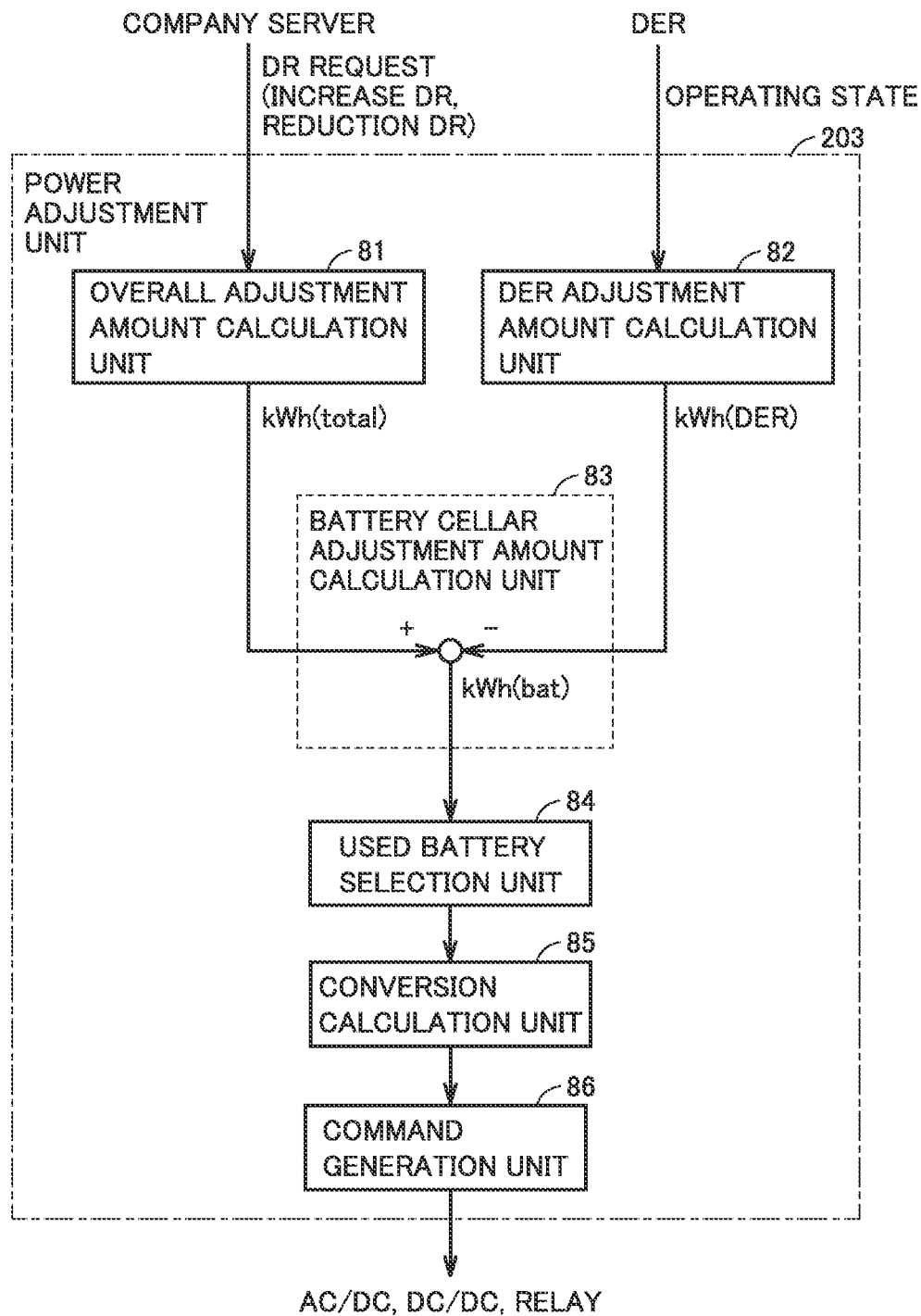
FIG. 13 is a functional block diagram of a server relating to power adjustment between a battery cellar and an electric power system.

FIG. 13 is a functional block diagram of the server 20 (power adjustment unit 203) relating to power adjustment between the battery cellar 2 and the electric power system 5. In this example, for ease of understanding, the DER 6 is assumed to be a power generation type DER (in particular, a natural variable power source such as a solar power generation facility). The power adjustment unit 203 includes an overall adjustment amount calculation unit 81, a DER adjustment amount calculation unit 82, a battery cellar adjustment amount calculation unit 83, a used battery selection unit 84, a conversion calculation unit 85, and a command generation unit 86.

Upon receipt of the DR request from the company server 50, the overall adjustment amount calculation unit 81 calculates an overall power amount that requires power adjustment during a predetermined period of time (for example, 30 minutes) using the battery cellar 2 and the DER 6. This amount of power is hereinafter referred to as an overall adjustment amount, and is also referred to as kWh (total). The overall adjustment amount calculation unit 81 outputs the calculated kWh (total) to the battery cellar adjustment amount calculation unit 83.

The DER adjustment amount calculation unit 82 acquires the operating state of each DER 6 (more specifically, the expected power amount generated by each DER 6 during a predetermined period) by communicating with the DER 6. This amount of power is hereinafter referred to as a DER adjustment amount, and is also referred to as kWh (DER). The DER adjustment amount calculation unit 82 outputs the acquired kWh (DER) to the battery cellar adjustment amount calculation unit 83.

Based on kWh (total) from the overall adjustment amount calculation unit 81 and kWh (DER) from the DER adjustment amount calculation unit 82, the battery cellar adjustment amount calculation unit 83 calculates the amount of power required to adjust the power using the battery cellar 2. This amount of electric power is hereinafter referred to as battery cellar adjustment amount, and is also referred to as kWh (bat). The battery cellar adjustment amount calculation unit 83 can calculate, for example, ΔkWh=kWh (total)−kWh (DER), which is the difference between the two power amounts, as the battery cellar adjustment amount kWh (bat). The battery cellar adjustment amount calculation unit 83 outputs the calculated kWh (bat) to the used battery selection unit 84.

The used battery selection unit 84 grasps the amount of electric power that can be charged and discharged for each of the multiple used batteries 9 stored in the plurality of storage units 21 (see battery data in FIG. 5). The used battery selection unit 84 selects a used battery to be used for power adjustment from among a large number of used batteries 9 based on kWh (bat) from the battery cellar adjustment amount calculation unit 83. When kWh (bat)>0, the shortage of power of the electric power system 5 is compensated by the discharge from the battery cellar 2. Therefore, the used battery selection unit 84 selects a number of used batteries 9 capable of discharging an amount of electric power equal to or greater than kWh (bat). On the other hand, when kWh (bat)<0, the excess power of the electric power system 5 is absorbed by charging the battery cellar 2. Accordingly, the used battery selection unit 84 selects a number of used batteries 9 that can be charged with an amount of power equal to or greater than kWh (bat) (absolute value). When the used batteries 9 are selected, the used batteries 9 of the high operating group are charged and discharged preferentially, while the used batteries 9 of the low operating group are charged and discharged as little as possible. The details of this process have been described in detail with reference to FIGS. 9 to 11, and therefore, the description thereof will not be repeated. The used battery selection unit 84 outputs the selected used battery 9 and the amount of electric power allocated to each selected used battery 9 (the amount of electric power adjusted by each used battery 9) to the conversion calculation unit 85.

The conversion calculation unit 85 calculates the power charged and discharged to and from the used battery 9 for each used battery 9 selected by the used battery selection unit 84. More specifically, the conversion calculation unit 85 converts the amount of electric power (unit: kWh) adjusted by the used battery 9 into electric power (unit: kW) for each used battery 9 using the remaining time of the electric power adjustment. For example, when the power adjustment amount assigned to a certain used battery 9 is 10 kWh and the remaining time of the power adjustment is 15 minutes, 10 kWh×(60 minutes/15 minutes)=40 kW can be calculated. The conversion calculation unit 85 outputs the power charged and discharged to each used battery 9 to the command generation unit 86.

The command generation unit 86 generates a charge/discharge command to the AC/DC converter 22 and the DC/DC converter 23 and generates an open/close command to the relay 213 based on the calculation result obtained by the conversion calculation unit 85. More specifically, the command generation unit 86 generates an open/close command such that the selected used battery 9 is electrically connected to the DC/DC converter 23 while the unselected used battery 9 is electrically disconnected from the DC/DC converter 23. The command generation unit 86 generates a charge/discharge command so that the total power assigned to the selected used battery 9 is charged/discharged.

Note that the power adjustment method shown in FIG. 13 is merely an example. In this example, it is assumed that the DER 6 is a power generation type DER, in particular, a natural fluctuation power source in which the power generation amount cannot be controlled. Therefore, the battery cellar adjustment amount calculation unit 83 calculates the battery cellar adjustment amount kWh (bat) based on the difference kWh (total)−kWh (DER) obtained by subtracting the DER adjustment amount kWh (DER) from the total adjustment amount kWh (total). That is, in this example, after the DER adjustment amount kWh (DER) is determined, the final power adjustment is performed by the battery cellar adjustment amount kWh (bat). However, for example, when the DER 6 includes a storage type DER, the battery cellar adjustment amount calculation unit 83 may distribute the overall adjustment amount kWh (total) to the DER adjustment amount kWh (DER) and the battery cellar adjustment amount kWh (bat), and perform power adjustment using both the DER adjustment amount kWh (DER) and the battery cellar adjustment amount kWh (bat).

As described above, in the present embodiment, the degree of degradation of each used battery 9 is evaluated in a state of being stored in the storage unit 21. Thus, the storage period of the used battery 9 can be effectively utilized in terms of time. Further, charging and discharging of the used battery 9 for evaluating the degree of degradation of the used battery 9 is basically performed in response to a DR request from the company server 50. When the number of used batteries 9 is large, large power is charged and discharged, and the large power is transmitted and received between the battery cellar 2 and the electric power system 5 in response to a DR request from the company server 50. As a result, since the management company of the battery cellar 2 can receive a payment of a price (incentive) from the power company, the price can be used as a running cost of the battery cellar 2. Alternatively, the management company of the battery cellar 2 can recover a part of the initial investment (initial cost) of the battery cellar 2. Thus, the storage period of the used battery 9 can be effectively utilized in a monetary manner.

Further, in the present embodiment, charging and discharging of the used batteries 9 in the low operating group is suppressed as compared with the used batteries 9 in the high operating group. As a result, it is possible to suppress degradation of the used batteries 9 in the low operating group due to charging and discharging, and thus it is possible to maintain the rank of the used batteries 9 in each rank included in the low operating group. Therefore, the stock of the used batteries 9 in each rank can be sufficiently secured.

In the above-described embodiment, the used battery 9 which functions as the VPP may or may not be stored in the battery cellar 2. The battery cellar 2 may or may not be divided into a region in which the used batteries 9 of the high operating group are stored and a region in which the used batteries 9 of the low operating group are stored, among the groups of used batteries 9.

In the above-described embodiment, the used batteries 9 stored in the battery cellar 2 are divided into a low operating group and a high operating group. However, the present invention is not limited thereto, and the used batteries 9 stored in the battery cellar 2 may be divided into three or more groups including the first battery group and the second battery group, and the same processing as the processing for the low operating group and the high operating group may be performed on the first battery group and the second battery group of the divided groups. In this case, the first battery group corresponding to the low operating group includes the used batteries 9 of all ranks.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery management system comprising:
    battery groups each including a plurality of batteries;
    a power converter electrically connected between the plurality of batteries and an electric power system; and
    a control device that controls operation of the power converter in accordance with a demand response request from the electric power system, to cause charging and discharging of the plurality of batteries included in the battery groups, wherein
    the battery groups include a first battery group and a second battery group that is less than or equal to the first battery group in terms of the number of types of ranks of batteries included in each battery group, the ranks each represent a degree of battery degradation, and
    the control device suppresses charging and discharging of the plurality of batteries included in the first battery group, relative to charging and discharging of the plurality of batteries included in the second battery group.

2. The battery management system according to claim 1, further comprising a switching device capable of switching between electrical connection and electrical disconnection between the plurality of batteries and the electric power system, wherein
    the control device controls the switching device to cause batteries included in the first battery group to be electrically disconnected from the electric power system.

3. The battery management system according to claim 1, wherein the control device suppresses charging and discharging of batteries included in the first battery group, relative to charging and discharging of batteries included in the second battery group, when the batteries included in the first battery group have an SOC within a predetermined SOC range that enables progress of battery degradation to be suppressed.

4. The battery management system according to claim 1, wherein the control device causes an amount of charging and discharging power of batteries included in the first battery group in a predetermined period to be smaller than an amount of charging and discharging power of batteries included in the second battery group in the predetermined period.

5. The battery management system according to claim 1, wherein the control device causes a frequency of charging and discharging of batteries included in the first battery group to be lower than a frequency of charging and discharging of batteries included in the second battery group.

6. The battery management system according to claim 1, wherein the first battery group includes batteries of all ranks.

* * * * *